(12) United States Patent  
Estrella et al.

(10) Patent No.: US 7,153,032 B2  
(45) Date of Patent: Dec. 26, 2006

(54) BEZEL FOR FIBER OPTIC COMPONENTS

(75) Inventors: Jeffrey Estrella, Tewksbury, MA (US); George Ashouri, Wheaton, IL (US)

(73) Assignee: Tellabs Operations Inc., Naperville, IL (US)

( * ) Notice: Subject to any disclaimer, the term of this patent is extended or adjusted under 35 U.S.C. 154(b) by 0 days.

(21) Appl. No.: 11/378,348

(22) Filed: Mar. 20, 2006

(65) Prior Publication Data

US 2006/0193563 A1    Aug. 31, 2006

Related U.S. Application Data

(63) Continuation of application No. 10/775,682, filed on Feb. 10, 2004, now Pat. No. 7,036,994, which is a continuation of application No. 09/628,348, filed on Jul. 28, 2000, now Pat. No. 6,695,485.

(51) Int. Cl.
    *G02B 6/36* (2006.01)
(52) U.S. Cl. .......................... 385/53; 385/77
(58) Field of Classification Search ............ 385/53–55, 385/60, 77, 78, 140; 439/553, 557
    See application file for complete search history.

(56) References Cited

U.S. PATENT DOCUMENTS

| | | | |
|---|---|---|---|
| 3,781,537 A | 12/1973 | Ramsey .................... 240/8.16 |
| 4,261,640 A | 4/1981 | Stankos et al. .......... 350/96.15 |
| 4,611,887 A | 9/1986 | Glover et al. .................. 385/71 |
| 4,753,511 A | 6/1988 | Bowers et al. ........... 350/96.21 |
| 4,900,124 A | 2/1990 | Lampert et al. ......... 350/96.21 |
| 4,960,317 A | 10/1990 | Briggs et al. ................. 385/56 |
| 5,046,956 A | 9/1991 | Takano ........................ 439/78 |
| 5,073,046 A | 12/1991 | Edwards et al. ............... 385/90 |
| 5,082,345 A | 1/1992 | Cammons et al. ............ 385/60 |
| 5,124,506 A | 6/1992 | Briggs et al. .................. 174/67 |
| 5,142,597 A | 8/1992 | Mulholland et al. .......... 385/56 |
| 5,222,908 A | 6/1993 | Baker, III et al. .......... 439/557 |
| 5,274,729 A | 12/1993 | King et al. .................. 385/134 |
| 5,542,015 A | 7/1996 | Hultermans ................... 385/60 |
| 5,734,770 A | 3/1998 | Carpenter et al. ............. 385/72 |
| 5,734,778 A | 3/1998 | Loughlin et al. ............ 385/140 |
| 5,748,819 A | 5/1998 | Szentesi et al. ............... 385/60 |
| 5,810,614 A | 9/1998 | Ruch .......................... 439/557 |
| 5,876,246 A | 3/1999 | Martin ........................ 439/557 |
| 5,887,100 A | 3/1999 | Robertson ..................... 385/76 |
| 5,896,477 A | 4/1999 | Stephenson et al. .......... 385/53 |
| 5,930,426 A | 7/1999 | Harting et al. ................ 385/56 |
| 5,956,444 A | 9/1999 | Duda et al. ................... 385/53 |
| 6,081,647 A | 6/2000 | Roth et al. .................. 385/139 |
| 6,149,315 A | 11/2000 | Stephenson .................. 385/60 |
| 6,186,670 B1 | 2/2001 | Austin et al. ................. 385/55 |
| 6,188,827 B1 | 2/2001 | Stephenson ................. 385/140 |

(Continued)

*Primary Examiner*—Hae Moon Hyeon  
(74) *Attorney, Agent, or Firm*—Fitzpatrick, Cella, Harper & Scinto

(57) ABSTRACT

A bezel for facilitating the connection between an external device positioned on one side of a communication panel and a module located on the other side of the panel wherein the panel has an opening for receiving the bezel. The bezel includes a housing defining an interior portion of the bezel, a first open end for insertion into the opening of the panel and the module, where the first open end receives a first communication connection from the module for connection with the external device, and a second open end having a removable cover. The second open end receives a second communication connection from the external device for connection with the first communication connection.

26 Claims, 2 Drawing Sheets

U.S. PATENT DOCUMENTS

| | | | |
|---|---|---|---|
| 6,302,592 B1 | 10/2001 | Zullig | 385/60 |
| 6,354,746 B1 | 3/2002 | Lee | 385/77 |
| 6,447,172 B1 | 9/2002 | Stephenson et al. | 385/70 |
| 6,508,593 B1 | 1/2003 | Farnsworth et al. | 385/55 |
| 7,029,182 B1 * | 4/2006 | Ngo | 385/53 |
| 2004/0240826 A1 * | 12/2004 | Daoud et al. | 385/135 |

* cited by examiner

BEZEL FOR FIBER OPTIC COMPONENTS

This application is a continuation of application Ser. No. 10/775,682, filed Feb. 10, 2004, now U.S. Pat. No. 7,036,994 which is a continuation of application Ser. No. 09/628,348, filed Jul. 28, 2000 now U.S. Pat. No. 6,695,485.

FIELD OF THE INVENTION

The present invention relates to a bezel for connection of optical components to an optical coupler. More particularly, the present invention relates to a bezel for connecting an optical attenuator to an optical coupler.

BACKGROUND OF THE INVENTION

Connectors for optical fiber transmission systems are known in the art. Often times it becomes necessary to arrange a plurality of optical fiber connectors in a panel to facilitate multifiber connections. Desirably, devices for holding connectors are mounted in the panel but the connectors themselves are not connected to incoming or outgoing fiber paths until needed to provide service. Commonly used devices which are used to accommodate interconnections are referred to as couplings.

A very much used connector for terminating and connecting two optical fibers is one which is referred to as an SC connector. An SC connector is connected to another SC connector from a module through an SC coupling by linear motion only.

Many optical fiber communication systems require a method of decreasing optical power at a reducing station to avoid the saturation of receivers. Such a reduction in power may be accomplished by introducing into the system a device known as an attenuator which is designed to dissipate or to attenuate a controlled fraction of the input power while allowing the balance to continue through the system. Such an attenuator is disclosed in U.S. Pat. No. 5,082,345 in the names of R. R. Cammons, A. W. Carlisle and N. R. Lampert.

Typically, an attenuator is attached to an SC optical coupler which is attached to a communication module within a control panel; attenuators are very often not included on an optical communication module until a connection is required. This is because depending upon the connection, a different strength optical signal may be required. At the time a connection is required, the panel is opened, and the module containing the SC optical coupler is removed so that an appropriate attenuator may be connected.

This method of installing an attenuator is very laborious and requires that the communication module from which the SC optical coupler is connected to be placed temporarily out of service.

Thus, there exists the need to be able to attach an attenuation device to the module without having to take the module out of service.

SUMMARY OF THE INVENTION

The present invention addresses the above concern and presents a new and novel device for facilitating the connection of an external optical component to a panel. Moreover, the present invention lends itself to connection of an attenuation device to an optical coupler without disrupting an optical module.

In one aspect of the present invention, a bezel for facilitating the connection of an optical connector between an optical couple positioned on a module within a panel. The bezel includes a housing, a first end for insertion into the panel, an interior portion positioned within the housing for positioning of an optical coupler and a second end having a removable cover concealing an opening. The opening exposes an end of the optical coupler positioned within the interior of the bezel for connection to the external device.

In another aspect of the present invention, the above described bezel may be used in conjunction with a fiber optical connection panel which includes a communication module including a fiber optical connector for making a connection with an external optical device, and connection surface adjacent the module having an opening corresponding to the connector. The bezel according to the present invention is positioned within the opening and facilitates the optical connection between the connector and the external device.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
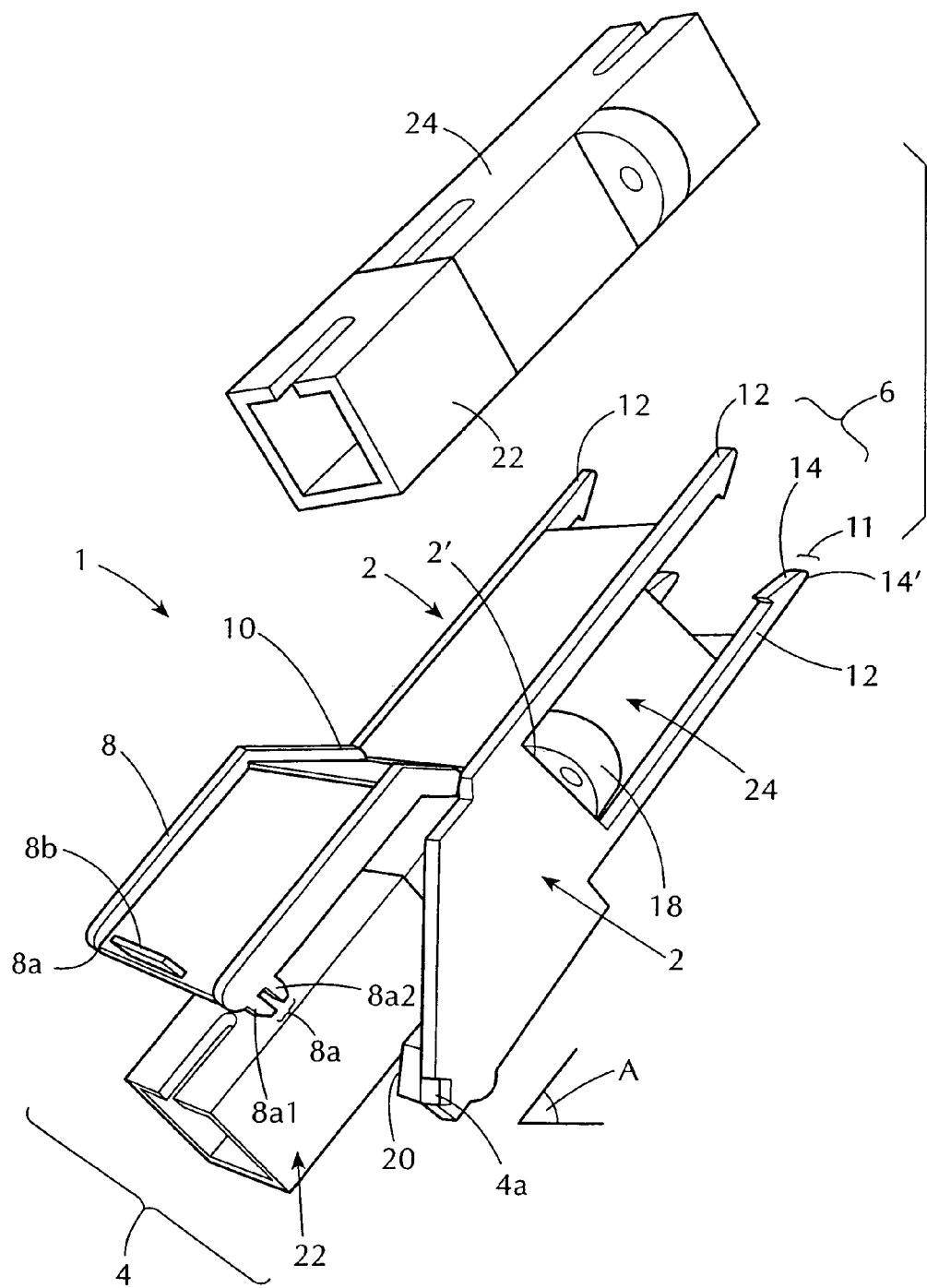
FIG. 1 is a perspective view of a bezel for connection of optical components according to the present invention.

Referring now to FIG. 1, a bezel 1 for facilitating connection of an attenuator 22 to an optical coupler 24 includes a housing 2, an end 6 for being received in a corresponding receiving area in an optical communication module within an opening in a panel housing optical fiber connections and the like. The housing 2 is a body that has a first peripheral end, at least one edge 2' of which engages with the optical coupler 24 at a corresponding edge or retaining tab 18 of the optical coupler 24 extending from a body portion of the optical coupler 24 (for convenience, only one edge 2' and one tab 18 are shown in the drawings).

The bezel may be manufactured from a variety of materials including metal and plastic, but is preferably made from plastic, and is preferably manufactured by injection molding.

The bezel 1 also includes an end 4 having a hinged cover 8, which conceals an opening exposing an end of an optical coupler 24 positioned in an interior portion within the bezel housing. The cover 8 abuts edges of the housing 2 forming a second peripheral end of the body of housing 2, when the cover 8 is in a closed position, and the housing 2 has at least one guiding member (structural abutment) 20 disposed along an interior wall of the housing 2, for guiding an external device, such as the attenuator 22, within the interior of the housing 2. For convenience, only a single guiding member 20 is shown in the drawings, although there may be a guiding member 20 disposed along both opposing interior walls of the housing 2.

The hinged portion 10 of the cover may be integral with the housing 2, or it may include an actual hinge, a half of which is included on the cover and the remaining half being positioned on an upper portion of the end 4 of the bezel.

The cover may also include locking tabs 8a. The tabs 8a include two halves 8a1 and 8a2 with ends having inclined surfaces that enable easy insertion into a corresponding opening 4a positioned adjacent end 4 of the bezel housing 2. When the cover is placed in a closed position to conceal the interior portion within the end 4, the two halves of the tabs 8a compress together. A force generated by the compression of the halves is placed on the sides of the openings 4a, allowing the cover to remain in a closed position.

The cover is easily opened by applying an outward force on lifting tab 8b. The outward force overcomes a frictional force created between each half of the locking tabs and the respective wall of the opening 4a, thereby allowing the cover to open and expose the interior of the bezel housing.

Adjacent end 6 of the bezel are several locking cams 11 positioned on the end of corresponding finger projections (projecting members) 12. Each projection 12 includes an end having an inclined portion 14 ending in a shoulder portion 14', wherein the inclined portion 14 and shoulder portion 14' of each projection 12 form a respective cam surface of the corresponding cam 11. The cams 11 are received in corresponding slots on a module within the panel, and lock thereto. The slots in the module surround an optical connector for connection to the coupler of the bezel. The cams 11 restrain the optical coupler in the bezel from linear movement away from optical connector of the optical module and also prevent the bezel from being pulled away from the panel, or dislodge in any way.

Figure 2:
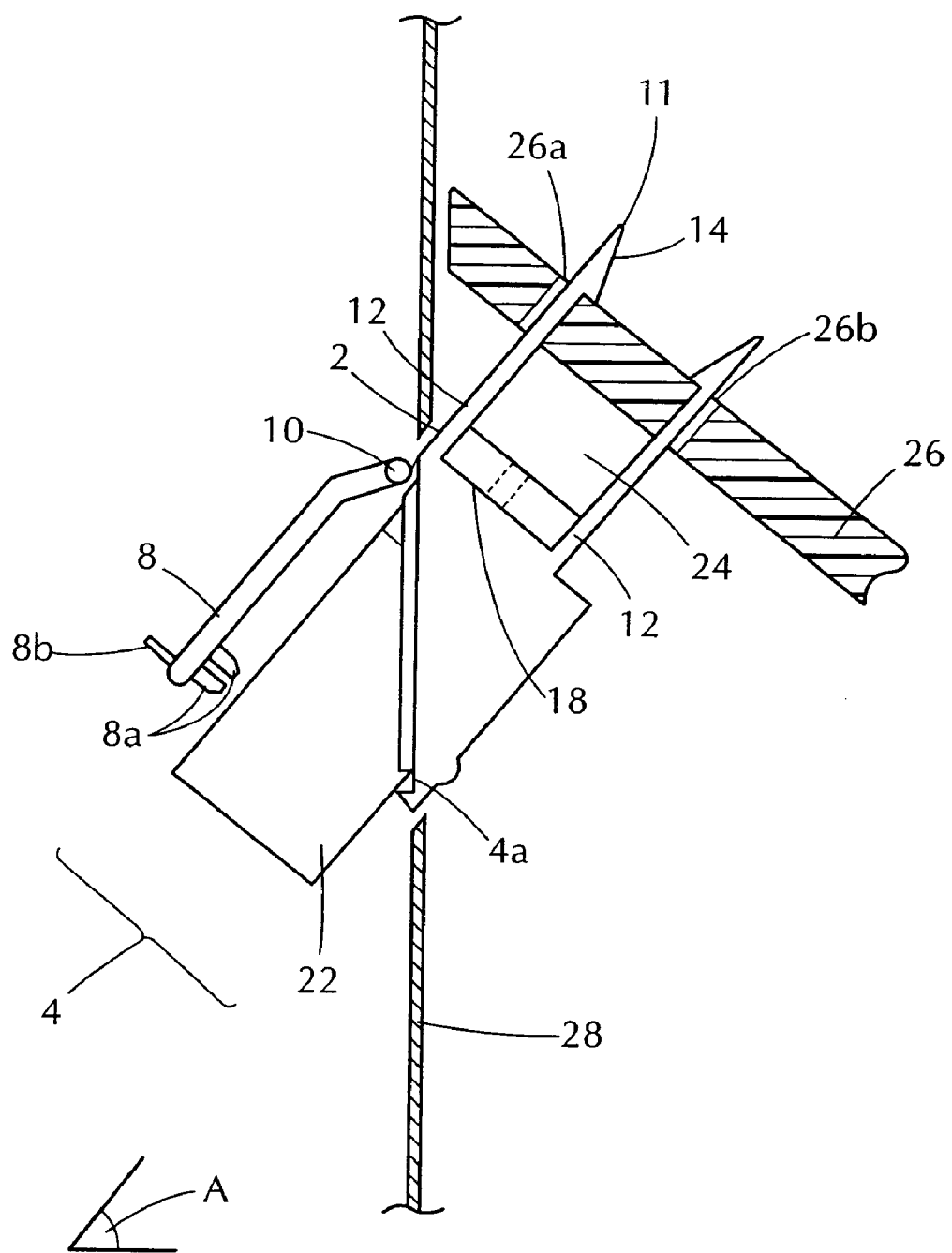
FIG. 2 is a side sectional view of the bezel according to the present invention.

As can be appreciated in view of FIGS. 1 and 2, the body of the housing 2 and the projections 12 define, in combination, a volume extending from the second peripheral end of the body of the housing 2, through an interior of the body, to distal ends of the projections 12. The volume can receive at least a portion of each of the optical coupler 24 and attenuator 22 therein.

It will be appreciated by one of skill in the art, that the bezel cover in the cover in the closed position is preferably flush with a vertical access panel surface of an optical connection box. Thus, the housing of the bezel is connected with the optical module at a downward angle, shown as angle A with a horizontal reference in FIG. 2. Positioning the bezel at a downward angle relative to a vertical access panel helps to avoid any potential eye injury to a technician working with the coupler within the bezel. Accordingly, if the bezel housing was instead mounted substantially perpendicular to the access panel, a technician might accidentally look directly into the optical coupler, and thus the light path, within the bezel housing potentially damaging his vision. By mounting the bezel housing at a downward angle, the direction of light emanating from the optical coupler within the bezel housing is downward away from the eye level of a technician and toward the ground.

FIG. 2 illustrates the bezel according to the present invention as assembled with an optical module 26 inside a panel 28. The locking cams 11 are received by corresponding slots 26a and 26b which allow the locking cams 11 to pass through and lock on the other side. The slots are positioned away from one another in the vertical direction as seen in FIG. 2 so that the distance between the inside walls of a pair of adjacent slots, 26a and 26b, is equal to the distance between the two corresponding projecting fingers 12 of the bezel. The slots are also formed so that the respective cam can easily fit through and lock on the other side.

As soon as the cams pass through the module wall, they lock into place, yielding an audible "snap" sound indicating that the bezel is locked into place. Thus, the bezel cannot be removed from outside the panel or the module.

Depending upon the bezel design, the front 4 of the bezel may snap into a cutout in the front panel of the optical connection box. When access to a particular optical module is required, the cover 8 is opened by pulling back on tab 8b, exposing the optical coupler. The external optical component may then be connected to the exposed end of the optical coupler to complete the communication connection.

This system is especially advantageous in connecting an attenuator to the optical module. Once an appropriate attenuator is selected for a particular application, one end of the attenuator is plugged onto an external optical connector, the bezel cover is lifted, and then the other end of the attenuator is plugged into the optical coupler positioned within the bezel housing.

It is to be understood that the above-described arrangements are simply illustrative of the invention. Other arrangements may be devised by those skilled in the art which will embody the principles of the invention and fall within the spirit and scope thereof.

What is claimed is:

1. A fiber optical system comprising:
a panel having an opening therein; and
an optical module positioned inside the panel and configured to couple to an external optical device,
wherein the optical module extends in a downward direction within the panel,
wherein the optical module includes at least a pair of spaced apart slots therein, each configured to receive at least one locking cam of a bezel at least part of which is configured to pass through the opening in the panel, wherein the optical module is coupleable to the external optical device through the bezel.

2. A fiber optical system according to claim 1,
wherein the pair of slots are spaced apart along a dimension of the optical module extending in the downward direction so that one slot is vertically higher than the other slot.

3. A fiber optical system according to claim 1,
wherein the panel is configured to receive the at least part of the bezel without fixedly securing the bezel thereto.

4. A fiber optical system according to claim 1, wherein the pair of slots are snap-fit slots providing a snap fit with the locking cams.

5. A fiber optical system according to claim 1, wherein the optical module is tilted with respect a vertical line.

6. A fiber optical system according to claim 1, wherein each slot of the optical module is configured to permit at least one of the locking cams of the bezel to pass therethrough and to lock therewith after passing therethrough.

7. A fiber optical system according to claim 1,
wherein the pair of slots in the optical module surround an optical connector,
wherein the bezel is configured to house an optical coupler, and
wherein when i) the locking cams of the bezel are locked in the slots of the optical module, ii) the bezel houses the optical coupler, and iii) the optical coupler housed in the bezel is connected to the external optical device, the optical module is coupled to the external optical device.

8. A fiber optical system according to claim 7, wherein the external optical device comprises an attenuator.

9. A fiber optical system according to claim 7, wherein the optical coupler housed by the bezel comprises an SC optical coupler.

10. A fiber optical system according to claim 1,
wherein the optical module comprises an optical connector, wherein the bezel includes:
a housing defining an interior portion configured to house an optical coupler coupleable to the external optical device and to the optical connector;
a first open end for insertion into the opening and configured to receive the optical connector for connection to the optical coupler; and
a second open end configured to receive at least a portion of the external optical device for connection to the optical coupler,
wherein the first open end includes a plurality of projecting members, each projecting member including an end having an inclined portion ending in a shoulder portion, each inclined and shoulder portion forming at least a portion of a cam surface of one of the locking cams,
wherein each slot of the optical module is configured to lock with the cam surface of at least one of the locking cams, and
wherein when i) the optical coupler is positioned within the interior portion of the housing of the bezel, ii) the optical coupler positioned within the interior of the housing of the bezel is connected to the external optical device, and iii) the pair of slots of the optical module lock with the cam surfaces of the locking cams of the bezel, the optical connector of the optical module is coupled to the optical coupler within the interior portion of the housing of the bezel, to couple the optical module to the external optical device.

11. A method for optically connecting a communication module disposed on an inside of a panel to a bezel that houses an optical coupler, the method comprising the steps of:
inserting the bezel through an opening in the panel; and
coupling a first end of the bezel to the communication module without fixedly securing the bezel to the panel itself and coupling the optical coupler housed in the bezel to the communication module.

12. A method according to claim 11, wherein the bezel has a second end configured to receive at least a portion of an external optical device for connection to the optical coupler, and wherein the method further comprises the step of:
coupling the external optical device to the optical coupler through the second end, thereby connecting the communication module to the external optical device through the optical coupler.

13. A method according to claim 12, wherein the external-optical-device coupling step is performed after the step of coupling the first end of the bezel to the communication module.

14. A method according to claim 11, further comprising the step of positioning at least a portion of the optical coupler within a housing of the bezel before the inserting step.

15. A method according to claim 14, wherein the first end of the bezel comprises a first end of the housing, wherein the first end of the housing is open to permit connection between the optical coupler and the communication module within the interior of the housing, wherein the housing of the bezel also comprises: an open second end configured to receive an optical element; and an inner channel extending from the first end to the second end and configured to guide the optical element in the housing to couple with the optical coupler, wherein the method further comprises the steps of:
inserting the optical element into the housing of the bezel through the open second end after the coupling step; and
guiding the insertion of the optical element into the housing and the coupling of the optical element to the optical coupler after the optical-element inserting step with the inner channel to couple the optical element with the communication module through the optical coupler.

16. A method according to claim 15, wherein the optical element is an optical attenuator.

17. A method according to claim 16, further comprising the step of:
coupling the attenuator to an external optical connector of the external optical device before the optical-element inserting step,
wherein the guiding and coupling step connects of the external optical device to the communication module through the external optical connector, the attenuator, and the optical coupler.

18. A method according to claim 17, wherein the guiding and coupling step couples the attenuator to one end of the optical coupler, and wherein the guiding and coupling step connects the external optical connector of the external optical device to an end of the attenuator opposite from an end of the attenuator to which the optical coupler is coupled.

19. A method according to claim 11, wherein the first end of the bezel is open to permit connection between the optical coupler and the communication module within the interior of the bezel, wherein the bezel also comprises an openable second end configured to receive an external optical device, and a cover disposed at the openable second end and being movable between a closed position to cover the openable second end and an opened position in which at least part of the openable second end is not covered by the cover, wherein the method further comprises the steps of:
opening the cover so that the cover is in the opened position to expose the interior of the bezel and the optical coupler; and
connecting the exposed optical coupler to the external device through the opened second end.

20. A method according to claim 11,
wherein the inserting step positions the bezel at an angle relative to the panel when the first end of the bezel is attached to the communication module in the coupling step.

21. A method according to claim 20,
wherein the bezel has a second end opposite from the first end, and
wherein the coupling step disposes the second end in a lower orientation than the first end when the first end of the bezel is coupled to the communication module.

22. A method according to claim 11,
wherein the bezel is configured to couple to the communication module without substantially disrupting operation of the communication module, and
wherein the coupling step is performed without substantially disrupting operation of the communication module.

23. A method according to claim 11,
wherein the bezel is configured to couple to the communication module without placing the communication module out of service, and
wherein the coupling step is performed without placing the communication module out of service.

24. A method according to claim 11, wherein the optical coupler is a SC coupler.

25. A method according to claim 11, wherein the coupling step comprises the step of inserting a plurality of locking cams attached to the first end of the bezel into a plurality of slots in the communication module and locking the locking cams into the slots.

26. A method according to claim 25, wherein the locking-cam-inserting step comprises the step of inserting the plurality of locking cams through the plurality of slots so that an end of each of the plurality of locking cams passes completely through one of the slots and locks into the one of the slots.

* * * * *

UNITED STATES PATENT AND TRADEMARK OFFICE
CERTIFICATE OF CORRECTION

PATENT NO. : 7,153,032 B2  
APPLICATION NO. : 11/378348  
DATED : December 26, 2006  
INVENTOR(S) : Jeffrey Estrella et al.

It is certified that error appears in the above-identified patent and that said Letters Patent is hereby corrected as shown below:

COLUMN 1:
   Line 17, "Often times" should read --Oftentimes--; and
   Line 67, "Couple" should read --coupler--.

COLUMN 2:
   Line 17, "DRAWING" should read --DRAWINGS--.

COLUMN 3:
   Line 23, "dislodge" should read --dislodged--.

COLUMN 4:
   Line 25, "spaced apart" should read --spaced-apart--.

COLUMN 6:
   Line 14, "of" should be deleted.

Signed and Sealed this

Seventeenth Day of April, 2007

JON W. DUDAS  
*Director of the United States Patent and Trademark Office*